J. R. JANNELLE.
TREAD CHAIN CONNECTOR.
APPLICATION FILED DEC. 26, 1916.

1,232,554.

Patented July 10, 1917.

Joseph R. Jannelle.
INVENTOR.

By

William C. Linton
Atty.

UNITED STATES PATENT OFFICE.

JOSEPH ROMUALD JANNELLE, OF MONTREAL, QUEBEC, CANADA, ASSIGNOR OF ONE-HALF TO JOSEPH ARTHUR JANNELLE.

TREAD-CHAIN CONNECTOR.

1,232,554.

Specification of Letters Patent.  Patented July 10, 1917.

Application filed December 26, 1916.  Serial No. 138,830.

*To all whom it may concern:*

Be it known that I, JOSEPH ROMUALD JANNELLE, a subject of the King of Great Britain, residing at Montreal, in the Province of Quebec, Canada, have invented certain new and useful Improvements in Tread-Chain Connectors; and I hereby declare that the following is a full, clear, and exact description of the invention, such as will enable others skilled in the art to which it appertains to make and use the same.

The present invention relates to connectors for connecting the ends of a chain together and more particularly for connecting the ends of tread chains used in connection with automobile tires. In applying tread chains to automobile tires, sometimes it is necessary to connect the ends of the chains quickly and at other times when removing the chain it is necessary to provide means for permitting the tread chain to be easily and readily removed. An object of the present invention is to provide a connector for connecting the ends of the tread chains used on automobile tires whereby they may be easily and readily connected or disconnected.

A further object of the invention is to provide a strong, durable and efficient connector of the character aforesaid which will be comparatively inexpensive in the cost of manufacture, thereby rendering the same commercially desirable.

With the above and other objects in view which will hereinafter appear as the description continues, the invention consists of the novel features of construction, combination and formation of parts as will be hereinafter more fully described and particularly pointed out in the appended claim.

In the accompanying drawings has been shown the simple and preferred form of the invention, it being, however, understood that no limitation is necessarily made to the precise structural details herein exhibited, but the right is hereby reserved to any changes, alterations or modifications to which recourse may be had that come within the scope of the claim without departing from the spirit of the invention or sacrificing the efficiency of the same.

In the accompanying drawings.

Referring now more particularly to the accompanying drawings wherein like and corresponding parts are designated by similar reference characters throughout the several views.

Figure 1:
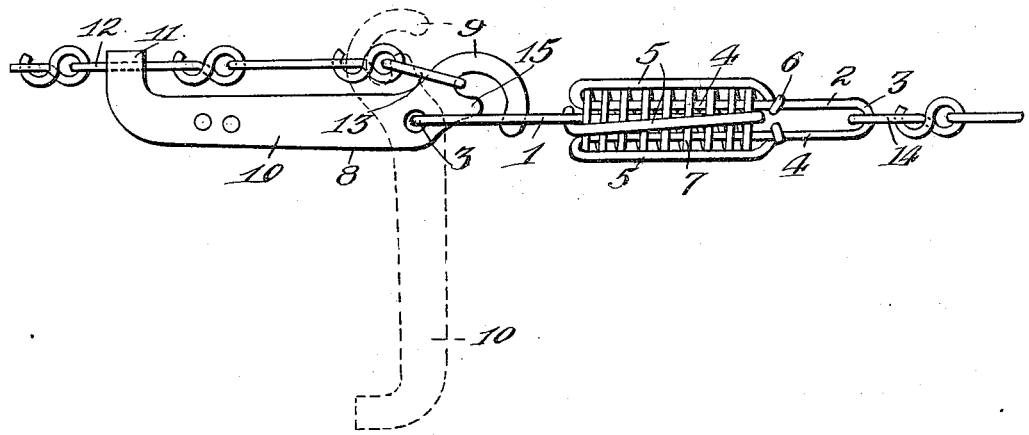
Figure 1 is a side elevation of the connector being shown in full lines in locked position when connecting the ends of a tread chain and having the locking lever thereof shown in dotted lines which is a position of the locking lever when it is desired to disconnect the chain.
Figure 2:
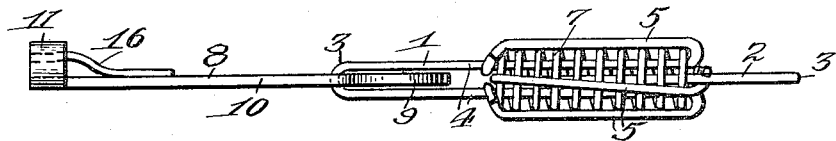
Fig. 2 is a plan view of the same.
Figure 3:
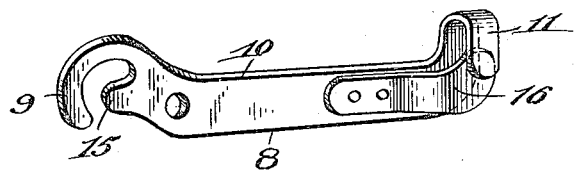
Fig. 3 is a perspective view of the locking lever.

The numerals 1 and 2 indicate two resiliently connected frames which are identical in construction and are arranged in opposite direction. Each frame is formed from a continuous strand of wire providing a loop portion 3 at their medial portions and extending from each loop are two parallel horizontal portions 4. The extremities of each wire are bent upon themselves as at 5 and the extreme outer ends are secured as at 6 to the horizontal portions, thereby forming loops at each end of each wire strand through which extends the coiled spring 7. This coiled spring 7 normally draws the frames 1 and 2 together, but readily permits a resilient adjustment. Pivotally connected to the loop 3 of the frame 1 is a locking lever 8. This locking lever 8 has a hook 9 formed in the shorter arm thereof and a longer arm 10 is to be used as a handle for swinging the locking lever upon its pivoted connection and this longer arm 10 is provided with a hooked locking member 11 adapted to engage and lock itself to one of the links 12 of the chain. One of the links 13 of this chain is adapted to be connected to the hook 9 whereas the link 14 at the opposite end of the chain is connected to the loop 3 of the frame 2.

When the tread chain is placed upon a vehicle tire having my connection applied thereto, the free end of the chain may be connected to the hook 9 and the projecting tongue 15 will assist in holding the chain within the hook. The locking lever is then swung upon its pivoted connection thereby drawing the chain tightly upon the tire and the resilient connection between the frames 1 and 2 will give so that the chain may take up any irregularities that should occur within the chain due to the different pressures of air contained within the pneumatic tire upon which the tread chain is applied. The hook 11 is then placed over one of the links of the chain and the leaf spring 16 will lock the hook member to the chain, thereby securely locking the ends of the chain together and at the same time providing a connection whereby the ends of the chain may be easily and readily unlocked.

From the foregoing it is obvious that I have provided a connector for tread chains which will permit the ends of the chain to be readily connected or disconnected and one that will be durable and more efficient in use.

Having thus fully described my invention, what I claim as new and desire to secure by Letters Patent is:

A tread chain connector for connecting the opposite ends of a chain, comprising two frames, each frame consisting of a single strand of wire, the medial portion of each strand of wire being bent to form a loop and positioned to extend at right angles to each other, the extremities of each strand of wire being bent back and secured to the medial portion of the wire for forming loops at the opposite ends of each strand of wire, the opposite ends of each frame, the end loops of each frame extending at straight angles to each other, a coil spring arranged within and protected by the loops at the extremities of said frames for connecting the frames together, means for permanently connecting the medial loop of one of the frames to one end of the chain, a locking member pivotally mounted within the medial loop of the other frame and adapted to be locked to the opposite end of the chain substantially as and for the purpose specified.

In witness whereof I have hereunto set my hand in the presence of two witnesses.

JOSEPH ROMUALD JANNELLE.

Witnesses:
  A. BASTIEN,
  H. MISCHER.